(12) United States Patent
Levy

(10) Patent No.: US 7,711,468 B1
(45) Date of Patent: May 4, 2010

(54) SYSTEM AND METHOD FOR CONTROLLING SPEED OF A MOVING VEHICLE

(76) Inventor: David Levy, 1187 Wall Rd., Broussard, LA (US) 70518

(*) Notice: Subject to any disclaimer, the term of this patent is extended or adjusted under 35 U.S.C. 154(b) by 367 days.

(21) Appl. No.: 11/970,069

(22) Filed: Jan. 7, 2008

(51) Int. Cl.
*G06F 19/00* (2006.01)

(52) U.S. Cl. .............................. 701/70; 701/33; 701/93; 701/207; 701/213; 342/357.06; 342/357.08; 340/441

(58) Field of Classification Search ................... 701/33, 701/36, 93, 96, 207, 213, 300; 342/357.06, 342/357.08; 475/169; 340/438, 441
See application file for complete search history.

(56) References Cited

U.S. PATENT DOCUMENTS

| 5,422,814 A | 6/1995 | Sprague et al. |
| 5,485,161 A | 1/1996 | Vaughn |
| 5,541,845 A | 7/1996 | Klein |
| 6,028,550 A | 2/2000 | Froeberg et al. |
| 6,246,948 B1* | 6/2001 | Thakker ...................... 701/93 |
| 6,728,605 B2* | 4/2004 | Lash et al. ..................... 701/1 |

* cited by examiner

*Primary Examiner*—Gertrude Arthur Jeanglaud
(74) *Attorney, Agent, or Firm*—Buskop Law Group, PC; Wendy Buskop

(57) ABSTRACT

A system, a method and device for controlling speed of a moving vehicle, using portable and repositionable global positioning devices, speed limit processors, and a database of legal vehicle speed limits is in communication with the speed limit processor. Computer instructions instruct the speed limit processor to match the current location of the moving vehicle with a legal vehicle speed limit for a defined location using the database. The speed limit processor communicates the legal vehicle speed limit to the vehicle processor to control the speed of the moving vehicle.

17 Claims, 2 Drawing Sheets

SYSTEM AND METHOD FOR CONTROLLING SPEED OF A MOVING VEHICLE

FIELD

The present embodiments relate to a system and method for controlling speed of a moving vehicle which is transportable between vehicles and requires no special software in a vehicle processor.

BACKGROUND

A need exists for a device that is portable for controlling speed in moving vehicles.

A need exists for a method for controlling the speed of various types of moving vehicles, including cars, trucks, boats, motorcycles, and any other types of vehicles required to comply with speed limit laws, that is portable, movable between vehicles, and easy to operate.

A further need exists for a system that is reliable, can use currently available GPS positioning networks and commercially made devices, such as Garmin™ or Tom Tom™, along with a portable, versatile processor that is capable of interfacing with various vehicles easily, seamlessly, and quickly, enabling a driver of a first vehicle to use the same system on a second vehicle that the driver operates with no special computer stills needed for moving the device from the first vehicle to the second vehicle.

A need exists for a portable speed control system for various vehicles, including boats, for controlling the speed of moving vehicles to conserve fuel.

Additionally, it is well known that teenage drivers have difficulty driving within known speed limits and can experience vehicular accidents more often than others. Parents are distressed and desire to control the driving of their children and prevent accidents, as insurance policy premiums for cars are steadily increasing. Parents desperately need to be able to buy an off-the-shelf device that any parent can install on any car, including rental cars and family cars, or even a boat, to control the speed of their teenager's driving.

A need exists for a portable speed control system, method, and device which can be installed by an untrained, unsophisticated parent or other user, without requiring knowledge of computer programming, on a vehicle driven by a teenager or another potentially reckless driver, and moved from one vehicle to another, to prevent the t accidents due to driving too fast in a speed controlled area.

The present embodiments meet these needs.

BRIEF DESCRIPTION OF THE DRAWINGS

The detailed description will be better understood in conjunction with the accompanying drawings as follows.

Figure 1:
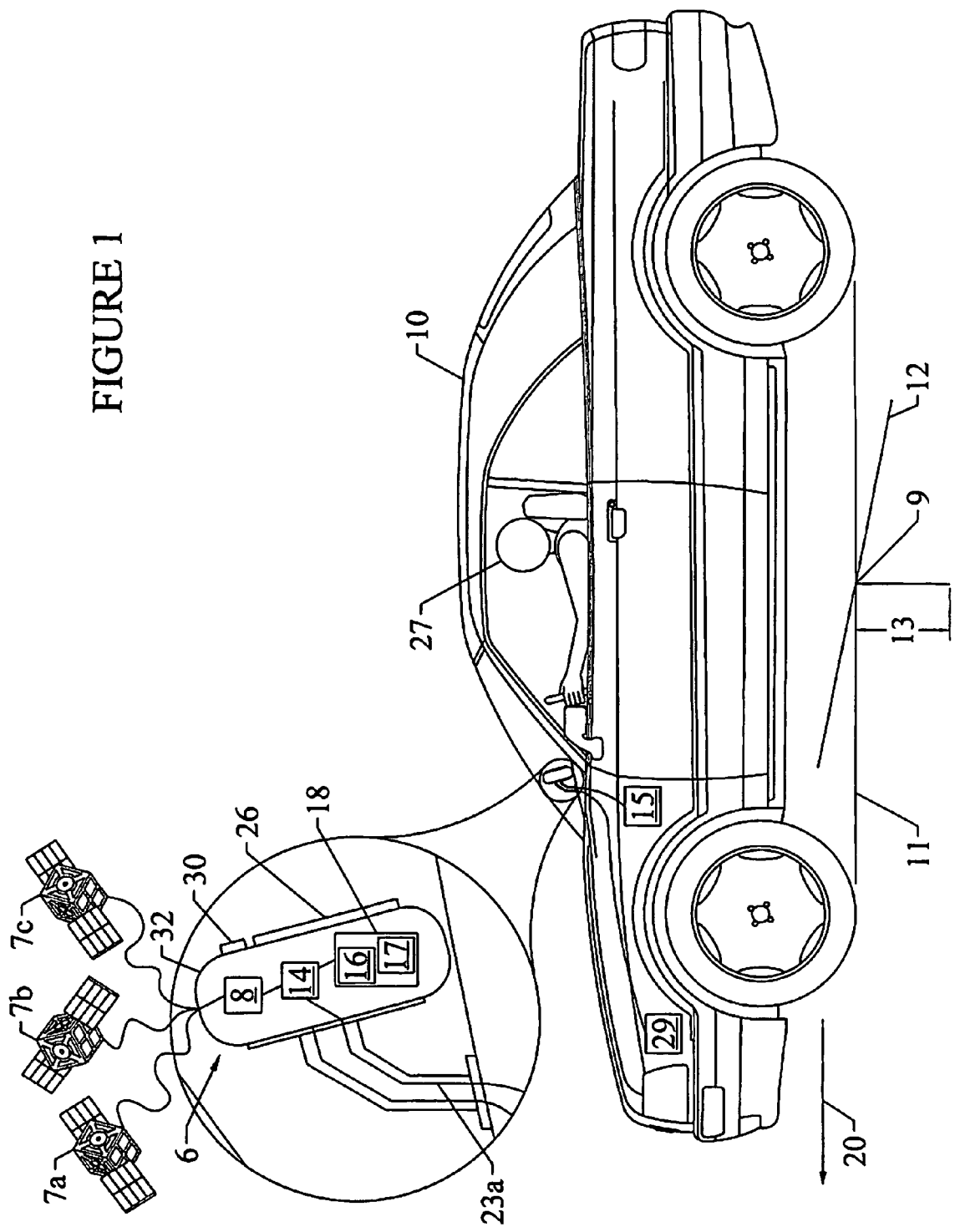
FIG. 1 depicts a diagram of an embodiment of the present system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a system for controlling speed of a moving vehicle that is portable, movable between vehicles, and is easy to install without the need for any computer programming training.

The invention comprises a speed control processor which communicates with a global positioning system (hereafter termed a "GPS"). The GPS is of a standard commercial variety able to communicate with a network of satellites orbiting the earth for providing a signal to the GPS device. The GPS has a GPS processor associated with software that then can compute in real time the location of the GPS from the satellite network, then communicate that real time location information to another device, such as a display or another processor.

The GPS, in an embodiment, can be a Tom Tom™ Model One, available from the Netherlands, which has a processor that can utilize stored mapping software on roads in various countries, and other data, such as locations of gas stations, airports, and restaurants. The GPS device is contemplated to be a device that can also calculate routes from a first point entered by a user to a second point entered by a user.

However, in the present invention, it is contemplated that the GPS can be used by a driver both for such mapping information, and as part of a monitoring and speed control system. The GPS of the present invention is thereby intended to have dual use, both mapping for a user and controlling speed of a moving vehicle.

An embodiment of the present invention contemplates that a user, such as a parent of a teenage driver, can already own a GPS device. In this embodiment, the GPS device can be connected to an inventive speed limit processor having data storage.

The speed limit processor is contemplated to have at least two different embodiments. In a first embodiment, the speed limit processor can store maps of geographical areas, similar to the GPS, but these maps contain only speed limit data. It is contemplated that this speed limit processor can update its speed limit maps periodically, such as through a user accessing a website controlled by a company offering maps with speed limits. Alternatively or additionally, the maps could be updated with each use by establishing a wireless connection to a network, such as the Internet, and automatically accessing a website connected to a sever for automatically downloading updates to speed limit maps that are registered to the particular user of the speed limit processor.

A second embodiment contemplates that the speed limit processor does not contain extensive memory with stored maps, but has a browser that wirelessly and automatically connects to a network, such as the Internet, and accesses a server at a defined address with continually updated maps that are accessible by GPS coordinates. In this embodiment, it is contemplated that the speed limit processor would transmit its GPS coordinates to the server with the continually updated maps, and the server would then transmit "rolling" map information, within 25 miles, or possibly 100 miles of the GPS coordinates, to the speed limit processor. The map information can contain the speed limits of all roads within 100 miles, 30 miles, 5 miles, or even 3 miles of the actual location of the GPS coordinates. The speed limit processor could then store that data in data storage while the present device is active and the car is being driven. The speed limit processor and the server would be in continual communication for real time updates as the vehicle moved through different GPS coordinates. When the vehicle was about to pass to within 1 mile of the limit of the maps transferred to the speed limit processor, then the server would be expected to update the maps to display another 5 mile, 15 mile, 35 mile or 200 mile range, or another range set by either the user of the speed limit processor or the administrator of the server. These limits might be regulated by a subscription agreement signed by the user for the continually updated service.

An embodiment of the invention contemplates that the speed limit processor might be a rentable box with an associated subscription agreement, for which a user could subscribe for a period of time. At the end of the subscription agreement, the speed limit processor would be returned to the administrator. This embodiment contemplates a business method for controlling speed limits of young drivers, or very old drivers who could potentially drive too slowly and create a dangerous situation, using a device that can be used with a car, easily removed by an ordinary person without special training, and used on a second vehicle.

The present invention contemplates that the GPS is physically connected to the speed limit processor.

The GPS and the speed limit processor are both contemplated to be portable, having on board power supplies, such as fuel cells, solar cells, or batteries for supplying power to their processors. It is also contemplated that the GPS and the speed limit processor can connect to a vehicular based power supply, such as a cigarette lighter or similar outlet useable for cellular telephones, DVD players, Game Boys™, and similar devices. It is contemplated that the GPS and the speed limit processor with data storage can have rechargeable power supplies.

The speed limit processor can communicate wirelessly to a server with a database containing information on all speed limits within a designated geographic area near the speed limit processor.

An embodiment contemplates that this speed limit processor could be used for emergency vehicles. In this embodiment, the present device could have an "emergency condition" feature which enables the speed limit processor to additionally compute the fastest routes between two points, and provide an "emergency alert" to first responders, such as police and hospitals, indicating the impending arrival of the emergency vehicle, the route being taken, and a preprogrammed message concerning the emergency, such as "heart attack victim onboard."

This embodiment enables the speed limit processor to provide two-way communication for emergency notification, which is a significant advantage of the present device. Not only can the speed limit processor provide bidirectional communication with the server for receiving speed limit information, but can also provide bidirectional communication to emergency responders, which is particularly important in congested cities, such as Houston, Tex., or during emergent situations, such as hurricane conditions.

The speed limit processor can independently or simultaneously interface with: (i) the GPS device; (ii) a user through a display, such as a parent desiring to control the speed driven by his or her teenage son; (iii) an optional server on a network to download speed limit maps; (iv) optional sensors associated with the speed limit processor to detect the speed of the moving vehicle relative to the coordinates, if the GPS device does not provide information on the speed of the vehicle; and (v) a processor on a moving vehicle (hereafter termed "vehicle processor".)

The speed limit processor is contemplated to use the speed limit maps, the GPS coordinates, and information on the speed of the vehicle (from the GPS device or the optional sensors) to instruct the vehicle processor to slow the vehicle down or accelerate the vehicle, depending on the actual speed limit for the location indicated by the GPS.

The present embodiments are widely applicable to any type of moving vehicle, including cars, trucks, boats, motorcycles, and any other moving vehicle required to comply with speed limit laws.

Boats are regulated by "no wake" zones, in which fines are imposed if a boat travels too quickly, and the present invention is contemplated to apply to boats and other watercraft and vessels.

The present embodiments are contemplated for use on new or used vehicles. The present device could be offered to car buyers as a feature, much like Navistar™ is offered to new car buyers.

By controlling the speed of moving vehicles, the present embodiments provide the dual benefit of both preventing drivers and operators of moving vehicles from receiving traffic citations for exceeding legal speed limits, and conserving the time, personnel, and resources of police departments and other traffic enforcement offices.

When fewer law enforcement personnel are required to enforce violations of speed limit laws, these personnel can be reallocated elsewhere, improving security, increasing safety, and preventing crime.

The present embodiments further provide the benefit of reduced fuel consumption. By controlling the speed of moving vehicles to remain at or below legal speed limits, the present embodiments save gasoline, thereby reducing the expenses incurred by drivers at a time when gasoline prices are steadily increasing.

Additionally, reduction in fuel consumption reduces the depletion of limited natural resources, as well as the associated environmental degradation caused by the retrieval and use of fossil fuels, such as oil spills, deforestation to accommodate drilling, and air pollution due to vehicular exhaust.

The present embodiments also save lives and prevent injury. By controlling the speed of moving vehicles to remain at or below legal speed limits, the potential for vehicular accidents is decreased. Similarly, by speeding the driving speed of habitually slow drivers, fewer accidents will occur, such as those caused by persons driving 10 mph in a 30 mph zone. Accelerating habitually slow drivers can also reduce road rage and traffic congestion.

Additionally, by controlling the rate of speed of teenage drivers and other drivers who habitually exceed the speed limit, fewer fatal vehicular accidents should occur given the lower rates of speed. Car accidents at lower rates of speed are normally less likely to be fatal, and the injuries and damages experienced are less severe.

The present embodiments are contemplated to reduce expensive damage to vehicles and roadside property, reduce expenses related to medical treatment for injuries, and prevent fatalities.

The global positioning device of the invention could be a Lowrance™, a Garmin™, or a similar vehicle mountable or portable global positioning device.

The global positioning device is contemplated to be in communication with three or more global positioning satellites. Any number of satellites can be in communication with the global positioning device, as necessary, to accurately provide a location.

The global positioning device has a global positioning processor, such as a Toshiba MIPS®-based TX39™ System RISC processor, for computing a current location of a moving vehicle. The current location is contemplated to include a latitude, such as 25 degrees North, a longitude, such as 93 degrees West, and an elevation, such as 9 feet above sea level.

A speed limit processor, which could be a computer that interfaces easily with the vehicle processor that operates the car's cruise control device, is in communication with the global positioning device. An example of a vehicle processor is a Drew Tech DashDAQ car engine computer, integral with the moving vehicle.

A database of legal vehicle speed limits is contemplated to be stored in data storage, in communication with the speed limit processor. In an embodiment, maps can be stored in the data storage of the speed limit processor. Another embodiment contemplates that maps are retrieved from a sever and stored in the data storage, the maps relating to a certain region.

It is also contemplated that the database in data storage can be in direct communication with the speed limit processor, such as stored on a removable USB drive connected to the speed limit processor.

The legal vehicle speed limits in the database are contemplated to be real time, continually updated, legal vehicle speed limits, stored by location. These legal vehicle speed limits include school zones, which are activated only at certain times, temporary construction zones, work areas, detours due to washed out bridges, as well as ordinary posted interstate speed limits of 55 mph, 50 mph, 65 mph, 75 mph, or other legal limits, and ordinary town limits, such as 20 mph, 30 mph or 35 mph.

Each legal vehicle speed limit in the database is contemplated to be associated with a defined longitude, a defined latitude, and a defined elevation. For example, a defined location at 25 degrees north, 108 degrees West, elevated at 64 feet, may have a legal vehicle speed limit of 70 miles per hour, while another defined location at 24 degrees north, 91 degrees West, elevated at 18 feet may have a legal vehicle speed limit of 30 miles per hour.

The speed limit processor is contemplated to instruct the vehicle processor to reduce the rate of travel of the vehicle, either by engine braking or reduced gas consumption, or increase engine speed (in the case of traveling too slowly), subject to a manual override by the driver.

It is contemplated that the manual override traveling too quickly could be locked out by an administrator, which could be a parent of a young driver, using a special security password or code.

It is anticipated that the portable, removable GPS and portable removable speed control processor could be installed in the engine of a vehicle in a manner, that if disconnected, the engine of the car would fail to start, or if running, the engine would stop running, thereby preventing the teenage drivers, persons renting a rental vehicle, and others from removing the device while driving and reinstalling the device later.

It is also contemplated that the speed limit processor can have a feature to track distance traveled during a specific trip, so that the parent could investigate how far the vehicle traveled and determine whether that distance matches the trip odometer of the car.

It is contemplated that the trip odometer could be correlated with the portable, removable, re-installable speed control device by establishing an interface with the vehicle processor that provides the odometer indication.

The speed limit processor, the vehicle processor, and the global positioning processor can be in wired communication with each other, or they can be in wireless communication, as described previously. The processors can also be in wireless communication using infrared devices, radio signals, bluetooth, or over one or more networks, such as the internet, a cellular network, or a satellite network. In an embodiment, it is possible that fiber optics could be used to removably connect the devices together.

An embodiment contemplates that the GPS and the speed limit processor can communicate over a first network simultaneously, while the speed limit processor communicates to the database and data storage simultaneously over a second network, and to the vehicular processor either directly or over a third network.

Combinations of wired and wireless communication are also contemplated between the devices. The networks could all be the same network or each network can be a unique network.

For example, the speed limit processor and the global positioning processor may be in wired communication, while communicating with the vehicle processor wirelessly.

The present system includes computer instructions in communication with the speed limit processor for instructing the speed limit processor to match the current location of the moving vehicle with a legal vehicle speed limit for a defined location using the database. These computer instructions can be stored in data storage such as memory of the processor or in removable data storage, such as a jump drive made by Lexar.

For example, if a car going 35 mph is located at 25 degrees North, 93 degrees West, and an elevation of 12 feet using the GPS, the speed limit processor can obtain the coordinates from the GPS, then communicate with the database on the USB drive to locate all legal vehicle speed limits within 5 miles of the GPS coordinate, including the specific speed limit for the current location, which for 25 degrees North and 93 West at an elevation of 12 feet is 25 mph. Then, the speed limit processor would advise the vehicular processor to slow the engine speed of the vehicle to reduce the speed of the car from 35 mph to 25 mph, to at least equal the legal vehicle speed. It is contemplated, in another embodiment, that the speed controller would instruct the vehicular processor to slow the car to a consistent 2 mph less than the legal speed limit, that is, 23 mph instead of 25 mph, to ensure greater caution while driving.

The present system is also contemplated to include computer instructions in communication with the speed limit processor for instructing the speed limit processor to instruct the vehicle processor to modify the real time speed of the moving vehicle to match the legal vehicle speed limit for the defined location, which changes as the vehicle moves.

It is contemplated that the speed limit processor can continually communicate with the global positioning device to match constantly changing locations of the moving vehicle to legal vehicle speed limits in the database. For example, as a car drives 3 miles in a direction, the GPS can update the speed limit processor with the changing location of the moving vehicle, while the speed limit processor accesses the database to acquire updated legal vehicle speed limits.

The speed limit processor communicates the legal vehicle speed limit for the defined location from the database to the vehicle processor. Computer instructions in communication with the vehicle processor instruct the vehicle processor to compare the real time speed of the moving vehicle to the legal vehicle speed limit for the defined location, then to control power to the moving vehicle to maintain the moving vehicle at or below the legal vehicle speed limit.

For example, if the real time speed of the moving vehicle is currently 45 miles per hour, and the legal vehicle speed limit for the defined location is 30 miles per hour, the vehicle processor can compare the two speeds, then control power to the moving vehicle to maintain the moving vehicle at or below 30 miles per hour.

In an embodiment, it is contemplated that the speed limit processor, rather than the vehicle processor, can compare the real time speed and the legal vehicle speed limit, and transmit a simple "speed up" or "slow down" command for execution by the vehicle processor. This embodiment is contemplated to function rapidly and efficiently by minimizing excess transmissions of data and allowing the speed limit processor to simultaneously receive GPS coordinates from the global positioning device, legal vehicle speed limits from the database, and a real time speed from the global positioning device or a vehicular speed sensor, then compare the legal vehicle speed limit to the real time speed for determining the appropriate command to transmit to the vehicle processor.

In an embodiment, the vehicle processor or speed limit processor can automatically accelerate or slow the moving vehicle to maintain the moving vehicle at or below the legal vehicle speed limit.

It is contemplated that the vehicle processor or speed limit processor can activate an alarm and notification system, such as a red blinking indicator, for advising a driver of the moving vehicle, in real time, when the moving vehicle exceeds or is below a defined legal vehicle speed limit for a current location of the moving vehicle.

It is contemplated that the vehicle processor can activate an alarm or other notification to alert the driver that the speed of the moving vehicle is about to change so as to not surprise the driver.

The alarm and notification system can include one or more audio alarms, such as tones or simulated voice messages generated by the moving vehicle or the global positioning device, one or more visual alarms, such as blinking lights, or combinations thereof.

The present system can also include, in an embodiment, a central power supply for providing power to both the global positioning device and the speed limit processor simultaneously. The central power supply can be the battery of the moving vehicle, or a separate power supply can be used, such as a rechargeable battery, a fuel cell, or solar power.

In a contemplated embodiment, the present system can include a housing for containing in one unit: a GPS, a power supply, a speed limit processor, and data storage with the database of the maps with legal vehicle speed limits. For example, the housing could hold a Garmin Foretrex 101 GPS, a Dell laptop computer, a Lexar jump drive and a 4-hour rechargeable battery. The housing can be watertight and cushioned with a threaded fastener for retaining the devices in the housing. Various ports can be in the housing for connecting the GPS, computer, and jump drive to the power supply. Suction cups can be secured to the housing to attach the device to the windshield of a car, or screws and steel clips can be used to securely attach the housing to the engine compartment of the vehicle, making it difficult for teenage drivers and others to remove the device. The housing should have a viewport through which the display of the GPS can be viewed. The housing should have a button for executing the manual override.

In an embodiment, the global positioning device can include computer instructions for presenting a map to a driver of the moving vehicle for depicting the current location and the legal vehicle speed limit, using the global positioning processor in communication with the speed limit processor.

It is contemplated that the computer instructions can further instruct the global positioning processor to display multiple legal vehicle speed limits on a second display that is connected to the speed limit processor. The second display can be viewable through the housing and display a map like the GPS map, but showing the legal speed limits relative to the vehicle's position, allowing the driver can anticipate changes in speed limits well in advance of signage posted by a municipality. This anticipation in change of speed limits can reduce stress on the driver.

For example, a driver viewing a map on the global positioning device could note that the legal vehicle speed limit at the current location is 55 miles per hour, while simultaneously using the displayed map and legal vehicle speed limits to note that the legal vehicle speed limit decreases to 35 miles per hour 3 miles ahead. The driver could anticipate this change in the legal vehicle speed limit and decelerate early to avoid a possible traffic citation, which is a significant benefit.

The present embodiments also relate to a method for controlling speed of a moving vehicle by first connecting a removable speed limit processor to a removable global positioning device located on a moving vehicle.

The next step of the method includes using the global positioning device to determine a location of a moving vehicle.

The next step then includes obtaining the coordinates of the location of the moving vehicle from the GPS by the speed limit processor.

Subsequently, the speed limit processor obtains the legal vehicle speed limits for the vehicle location from a database. The database is contemplated to be accessible from a server, such as a Mac OS X server, on a network, such as the internet, a satellite network, a cellular network, in communication with the speed limit processor, or the database can be stored on a jump drive or similar data storage medium that is periodically updatable. The database on the server can be periodically updated, or updated continuously in real time.

The speed limit processor can optionally display the legal vehicle speed limit on a display while instructing the vehicle processor of the moving vehicle, which can be a car, to change the speed of the car to be at or slightly below the identified legal speed limit.

In an embodiment, the method can include using wireless communication between the GPS, the database, the speed limit processor, and the vehicle processor.

The method contemplates presenting a map to a driver of the moving vehicle for depicting the current location of the vehicle and the legal vehicle speed limit.

Referring now to FIG. 1, a diagram of an embodiment of the present system is depicted.

A global positioning device (6) is depicted in communication with three global positioning satellites (7a, 7b, and 7c). While FIG. 1 depicts three global positioning satellites, the global positioning device (6) can be in communication with any number of satellites, as needed, to determine the location of the moving vehicle (10).

The global positioning device (6) is shown having a housing (32).

The global positioning device (6) is depicted having a display (26) for presenting a map or computer directions for a driver (27) of the moving vehicle (10).

The global positioning device has a global positioning processor (8) for computing a current location (9) of a moving vehicle (10).

The current location (9) of the moving vehicle (10) is represented by a latitude (11), a longitude (12), and an elevation (13).

A speed limit processor (14) is depicted in communication with the global positioning device (6). FIG. 1 depicts the speed limit processor (14) in the housing (32) with the global positioning device (6).

The speed limit processor (14) is also depicted in communication with a vehicle processor (15) on the moving vehicle (10).

Data storage (18) is shown in communication with the speed limit processor (14). Although the data storage (18) can be remote from the speed limit processor (14), the global positioning device (6), or combinations thereof, the data storage (18) is depicted in FIG. 1 engaging the speed limit processor.

The data storage (18) contains a database (16) of legal vehicle speed limits. Each legal vehicle speed limit is contemplated to be associated with a defined latitude, a defined longitude, and a defined elevation in the database.

Computer instructions (17) are shown in the data storage (18). The computer instructions (17) instruct the speed limit processor (14) to match the current location (9) of the moving vehicle (10) with a legal vehicle speed limit (23) for a defined location from the database (16). The computer instructions (17) can also instruct the speed limit processor (14) to instruct the vehicle processor (15) to modify a real time speed (20) of the moving vehicle (10) to match the legal vehicle speed limit (23).

The speed limit processor (14) communicates the legal vehicle speed limit (23) for the defined location to the vehicle processor (15). The computer instructions (17), or a separate set of computer instructions in communication with the vehicle processor (15), can instruct the vehicle processor (15) or the speed limit processor (14) to compare a real time speed (20) of the moving vehicle (10) to the legal vehicle speed limit (23) for the defined location.

The vehicle processor (15) is contemplated to control power to the moving vehicle (10) to increase or reduce the real time speed (20) to a speed at or below the legal vehicle speed limit (23).

The matching of the current location (9) with the legal vehicle speed limit (23) is contemplated to be performed continually, and the legal vehicle speed limits in the database (16) are contemplated to be continually updated.

An optional alarm and notification system (30) can be connected to the moving vehicle (10) and be in communication with the speed control processor for alerting the driver (27) when the real time speed (20) exceeds or is below the legal vehicle speed limit (23).

A power supply (29) is shown for providing power to the global positioning device (6) and the speed limit processor (14). The power supply (29) can be the battery of the moving vehicle (10), or another power source.

Figure 2:
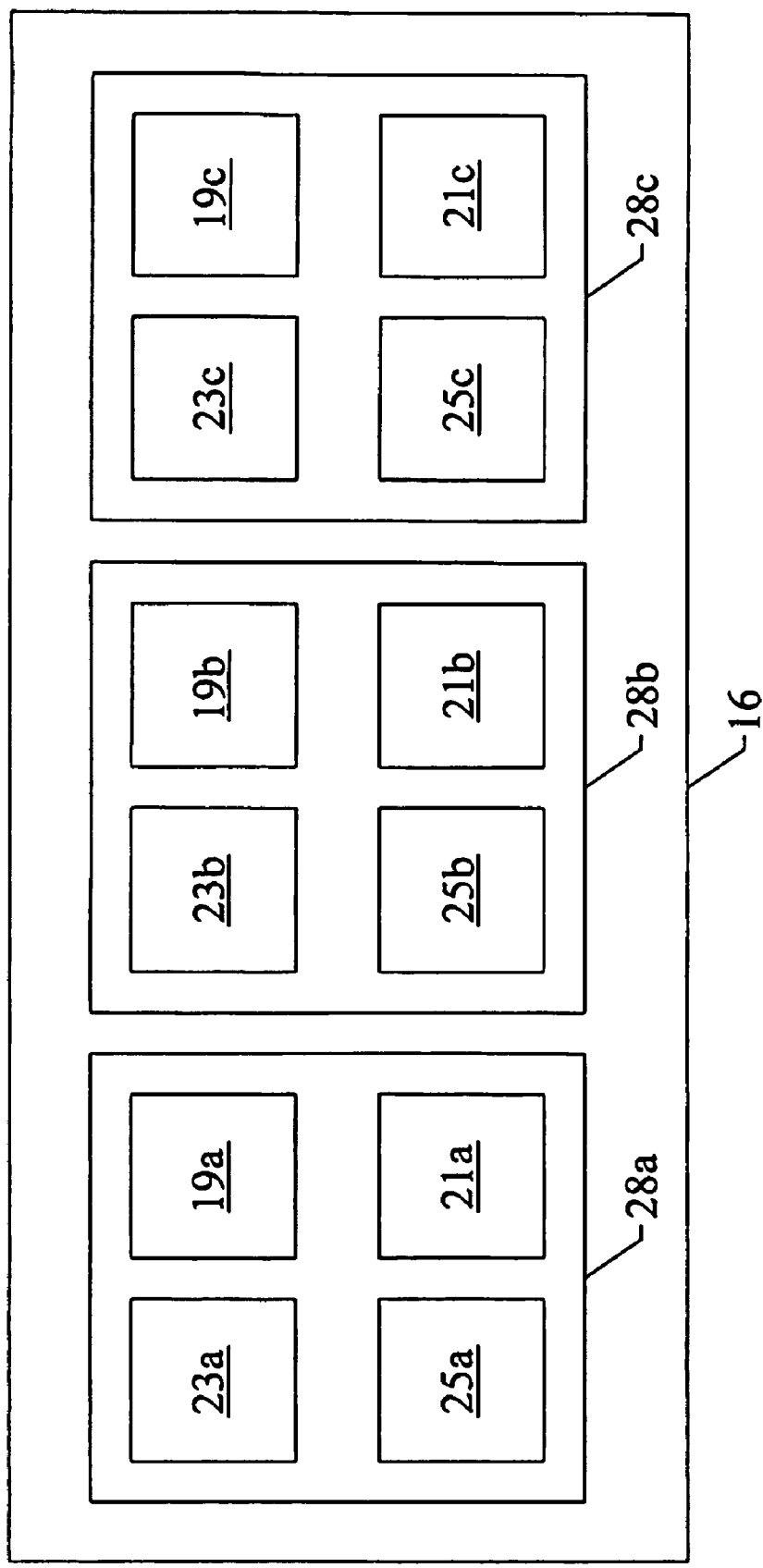
FIG. 2 depicts a diagram of an embodiment of a database useable with the present system.

Referring now to FIG. 2, a diagram of an embodiment of the database (16) is shown.

The database (16) is shown containing a first defined location (28a), a second defined location (28b), and a third defined location (28c). While FIG. 2 depicts the database (16) containing only three defined locations, it should be understood that the database (16) can contain any number of defined locations, located anywhere in the world.

The first defined location (28a) includes a first defined latitude (19a), a first defined longitude (25a), and a first defined elevation (21a). The first defined location (28a) is also associated with a first legal vehicle speed limit (23a).

The second defined location (28b) includes a second defined latitude (19b), a second defined longitude (25b), and a second defined elevation (21b). The second defined location (28b) is also associated with a second legal vehicle speed limit (23b).

The third defined location (28c) includes a third defined latitude (19c), a third defined longitude (25c), and a third defined elevation (21c). The third defined location (28c) is also associated with a third legal vehicle speed limit (23c).

For example, a speed limit processor in communication with a moving vehicle located at 25 degrees North, 93 degrees West, elevated 12 feet, can continually query the database (16) to determine a defined location closest to the current location of the moving vehicle. The first defined location (28a), located at 24 degrees North and 93 degrees West, elevated 12 feet, may be the closest defined location to the current location of the moving vehicle.

The first legal vehicle speed limit (23a), related to the first defined location (28a) may be 35 miles per hour. The speed limit processor would then transmit the first legal vehicle speed limit (23a) to a vehicle processor in the moving vehicle to control the speed of the moving vehicle. The vehicle processor would control power to the moving vehicle to maintain the speed of the moving vehicle at or below the first legal vehicle speed limit (23a).

While these embodiments have been described with emphasis on the embodiments, it should be understood that within the scope of the appended claims, the embodiments might be practiced other than as specifically described herein.

What is claimed is:

1. A system for controlling speed of a moving vehicle, comprising:
    a portable relocatable global positioning device in communication with at least three global positioning satellites, wherein the global positioning device has a global positioning processor for computing a current location of a moving vehicle, and wherein the current location comprises a latitude, a longitude, and an elevation of the moving vehicle;
    a portable relocatable speed limit processor in communication with the global positioning device and with a vehicle processor on the moving vehicle;
    a database of legal vehicle speed limits in data storage in communication with the speed limit processor, wherein each legal vehicle speed limit in the database is associated with a defined longitude, a defined latitude, and a defined elevation;
    computer instructions in communication with the speed limit processor for instructing the speed limit processor to match the current location of the moving vehicle with a legal vehicle speed limit for a defined location using the database of legal vehicle speed limits;
    computer instructions in communication with the speed limit processor for instructing the speed limit processor to instruct the vehicle processor to modify a real time speed of the moving vehicle to match the legal vehicle speed limit for the defined location;
    a power supply for providing power to the global positioning device and the speed limit processor; and
    wherein the speed limit processor communicates a legal vehicle speed limit for the defined location from the database to the vehicle processor, and wherein computer instructions in communication with the vehicle processor instruct the vehicle processor to compare the real time speed of the moving vehicle to the legal vehicle speed limit for the defined location and control power to the moving vehicle to maintain the moving vehicle at or below the legal vehicle speed limit.

2. The system of claim 1, wherein the speed limit processor further comprises computer instructions for presenting a map to a driver of the moving vehicle for depicting the current location and the legal vehicle speed limit.

3. The system of claim 1, wherein the moving vehicle is a car, a truck, a boat, a motorcycle, or another moving vehicle required to comply with speed limit laws.

4. The system of claim 2, further comprising computer instructions for instructing the speed limit processor to display multiple legal vehicle speed limits on the map.

5. The system of claim 1, wherein the speed limit processor comprises computer instructions for instructing the vehicle processor to automatically accelerate the moving vehicle or slow the moving vehicle to maintain the moving vehicle at or below the legal vehicle speed limit.

6. The system of claim 1, wherein the speed limit processor, the vehicle processor, and the global positioning processor are in wired communication, wireless communication, or combinations thereof, with each other.

7. The system of claim 1, further comprising a housing containing the global positioning device, the data storage, and the speed limit processor, wherein the housing is adapted to provide power from the moving vehicle to the vehicle processor, the speed limit processor, the global positioning device, or combinations thereof.

8. A method for controlling speed of a moving vehicle, comprising:
- connecting a removable repositionable global positioning device to the moving vehicle and a plurality of global positioning satellites;
- identifying a current location of the moving vehicle using the global positioning device;
- communicating the current location of the moving vehicle to a removable repositionable speed limit processor in communication with a database in data storage, wherein the database comprises a plurality of legal vehicle speed limits by location coordinates;
- determining the legal vehicle speed limit of the moving vehicle for the current location and a plurality of anticipated locations near the current location of the moving vehicle;
- communicating the determined legal vehicle speed limit to a vehicle processor of the moving vehicle in real time for the current location and the plurality of anticipated locations; and
- using computer instructions to instruct the vehicle processor to change the moving vehicle rate of speed to match or be below the determined legal vehicle speed limit.

9. The method of claim 1, further comprising using wireless communication between the processors to control power to the moving vehicle.

10. A device for controlling speed of a moving vehicle, comprising:
- a removable repositionable global positioning device (GPS) for communicating with global positioning satellites to identify in real time constantly changing locations of a moving vehicle;
- a removable, re-installable speed limit processor for communicating with a database comprising a plurality of legal speed limits for multiple locations and communicating with a vehicle processor, wherein the speed limit processor comprises computer instructions (i) to obtain a location for the moving vehicle from the GPS, (ii) to determine a legal vehicle speed limit for the location of the moving vehicle and for a plurality of surrounding locations from a database with a plurality of legal speed limits; and (iii) instruct the vehicle processor to slow down a moving vehicle to match or be less than the legal vehicle speed limit; and
- a power supply for operating the global positioning device and speed limit processor.

11. The device of claim 10, further comprising an alarm and notification system connected to the speed limit processor and the moving vehicle for advising a driver of the moving vehicle in real time when the moving vehicle exceeds or is below a defined legal vehicle speed limit for a current location of the moving vehicle.

12. The device of claim 10, wherein the speed limit processor further comprises computer instructions for presenting a map to a driver of the moving vehicle for depicting the current location and the legal vehicle speed limit of the moving vehicle and legal vehicle speed limits within 3 miles of the location.

13. The device of claim 10, wherein the moving vehicle is a car, a truck, a boat, a motorcycle, or another moving vehicle required to comply with speed limit laws.

14. The device of claim 11, wherein the speed limit processor further comprises computer instructions for displaying multiple legal vehicle speed limits on a map on a display for viewing by a driver.

15. The device of claim 10, wherein the speed limit processor and the global positioning device are in wired communication, wireless communication, or combinations thereof.

16. The device of claim 10, further comprising a housing containing the global positioning device, the data storage, and the speed limit processor, wherein the housing is adapted to acquire power from the moving vehicle and provide power to the speed limit processor and the global positioning device.

17. The device of claim 11, wherein the alarm and notification system comprises an audio alarm, a visual alarm, or combinations thereof.

* * * * *